(12) United States Patent
Bruder

(10) Patent No.: US 9,718,072 B2
(45) Date of Patent: Aug. 1, 2017

(54) DISPENSER SYSTEM

(71) Applicant: Thomas Bruder, Constance (DE)

(72) Inventor: Thomas Bruder, Constance (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 0 days.

(21) Appl. No.: 15/022,261

(22) PCT Filed: Aug. 18, 2014

(86) PCT No.: PCT/EP2014/067593
§ 371 (c)(1),
(2) Date: Mar. 16, 2016

(87) PCT Pub. No.: WO2015/039823
PCT Pub. Date: Mar. 26, 2015

(65) Prior Publication Data
US 2016/0228898 A1    Aug. 11, 2016

(30) Foreign Application Priority Data
Sep. 18, 2013    (DE) .......................... 10 2013 218 741

(51) Int. Cl.
*B05B 11/00* (2006.01)
*G01F 11/32* (2006.01)
(Continued)

(52) U.S. Cl.
CPC ........ *B05B 11/0048* (2013.01); *B05B 11/007* (2013.01); *B05B 11/0018* (2013.01);
(Continued)

(58) Field of Classification Search
CPC ............ B05B 11/0048; B05B 11/0018; B05B 11/0056; B05B 11/007; B05B 11/3047;
(Continued)

(56) References Cited

U.S. PATENT DOCUMENTS 8,636,039 B2 * 1/2014 Litten .................... A45D 34/02
                                                                 141/2
9,409,761 B2 * 8/2016 Lasnier ............... B05B 11/0056
(Continued)

FOREIGN PATENT DOCUMENTS

EP    2 383 204 A1    11/2011
EP    2 596 870 A1     5/2013
(Continued)

OTHER PUBLICATIONS

International Search Report issued in Application No. PCT/EP2014/067593 with English translation, date of mailing Dec. 15, 2014 (5 pages).

(Continued)

*Primary Examiner* — Frederick C Nicolas
(74) *Attorney, Agent, or Firm* — Flynn, Thiel, Boutell & Tanis, P.C.

(57) ABSTRACT

A dispenser system including a storage container a medium, having an outlet valve, a dispenser module having a medium chamber, a pumping device that is actuated to discharge medium from the medium chamber and having an inlet valve, and an actuating device. The medium chamber is a sealed chamber having a variable volume, and the dispenser module is coupled to the storage container to fill the medium chamber. During filling, the inlet valve and the outlet valve are opened such that the medium chamber communicates with the storage container. The actuating device has a magnet and a magnetic or magnetizable element interacting therewith for a volume change of the medium chamber. The actuating device causes a volume of the medium chamber to be enlarged to produce a differential pressure between the medium chamber and the storage container to convey medium out of the storage container into the medium chamber.

11 Claims, 2 Drawing Sheets

(51) Int. Cl.
 *B05B 1/34* (2006.01)
 *B05B 11/04* (2006.01)

(52) U.S. Cl.
 CPC ...... *B05B 11/0056* (2013.01); *B05B 11/3047* (2013.01); *G01F 11/32* (2013.01); *B05B 1/3415* (2013.01); *B05B 11/04* (2013.01); *B05B 11/30* (2013.01)

(58) Field of Classification Search
 CPC ....... B05B 1/3415; B05B 11/04; B05B 11/30; G01F 11/32
 See application file for complete search history.

(56) References Cited

U.S. PATENT DOCUMENTS

| | | | |
|---|---|---|---|
| 2011/0297275 A1 | 12/2011 | Farrar et al. | |
| 2012/0205401 A1* | 8/2012 | Litten | A45D 34/02 222/252 |
| 2014/0102584 A1* | 4/2014 | Lasnier | B05B 11/0056 141/18 |

FOREIGN PATENT DOCUMENTS

| | | |
|---|---|---|
| GB | 2483087 A | 2/2012 |
| WO | WO 2005/101969 A2 | 11/2005 |

OTHER PUBLICATIONS

Written Opinion of International Searching Authority issued in Application No. PCT/EP2014/067593, date of mailing Dec. 15, 2014 (4 pages).

\* cited by examiner

DISPENSER SYSTEM

FIELD OF APPLICATION AND PRIOR ART

The invention relates to a dispenser system comprising a storage vessel for storing a medium with at least one outlet valve, and a refillable dispenser module with a medium chamber which can be filled with a medium, with a pumping apparatus which has an inlet channel and can be actuated for discharging the medium out of the medium chamber, and with at least one inlet valve, it being possible for the dispenser module to be coupled to the storage vessel for filling the medium chamber, the at least one inlet valve and the at least one outlet valve being open in a forcibly actuated or pressure-loaded manner during filling, with the result that the medium chamber communicates with the storage vessel, and the at least one inlet valve and the at least one outlet valve being closed in a disconnected state of the dispenser module and the storage vessel.

Documents WO 2005/101969 A2, EP 2 383 204 A1 and EP 2 596 870 A1 have in each case disclosed refillable dispenser modules which have a check valve on the bottom surface. The refillable dispenser modules can be placed by means of the check valve, instead of a discharge head, onto a conventional dispenser with a discharging apparatus for filling. Here, filling of the dispenser module is brought about by way of the discharging apparatus of the second dispenser, the medium being sprayed, for example, into a vessel of the refillable dispenser. The dispenser modules have ventilating openings, via which air can escape out of the dispenser module during filling.

U.S. 2011/0297275 A1 has disclosed a dispenser system comprising a storage vessel and a refillable dispenser module with a variable-volume medium chamber, the dispenser system comprising an actuating apparatus, by means of which a differential pressure can be generated between the medium chamber and the storage vessel during or after the coupling of the dispenser module to the storage vessel, in order to convey medium out of the storage vessel into the medium chamber.

Problem and Solution

It is a problem of the invention to provide a dispenser system comprising a storage vessel and a dispenser module, which dispenser system makes reliable filling when using sensitive media possible.

This problem is solved by way of the dispenser systems having the features of claim 1.

According to the invention, an actuating apparatus is provided, the actuating apparatus having at least one magnet and at least one at least partially magnetic or magnetizable element which interacts with the magnet for a volume change of the medium chamber.

The medium chamber is designed as a closed chamber with a variable volume. A closed chamber denotes a chamber which does not have a ventilating opening or the like for pressure equalization in the case of a change in a filling volume. In a closed chamber, no or at least no relevant medium exchange with the surroundings therefore takes place. As a result, a medium can be stored in a chamber of this type substantially without contact with the surroundings. The dispenser module is therefore also suitable for sensitive media, such as pharmaceutical or cosmetic media which are free of preservatives.

When the dispenser module is used, the medium is discharged and a volume of the medium chamber is reduced for pressure equalization. During or after coupling of the dispenser module, the volume of the medium chamber is enlarged by means of at least one magnet and at least one at least partially magnetic or magnetizable element which interacts with the magnet. A pressure in the chamber is reduced as a result. If a normal pressure prevails in the medium chamber before an enlargement, a vacuum is generated as a result of the reduction in size. If a medium is stored under pressure in the medium chamber and the storage vessel, it is also conceivable that a pressure is greater than or equal to the normal pressure after the enlargement of the volume. In every case, the pressure which is generated is smaller than a pressure which prevails in the storage vessel.

In one refinement, the magnet is arranged on the dispenser module and the element which interacts with it is arranged on the storage vessel. In advantageous refinements, a magnet which interacts with a partially magnetizable element of the dispenser module is provided on the storage vessel. After a disconnection, the dispenser module therefore does not exert any magnetic powers of attraction on other elements. Magnets which exert only a low power of attraction can be used for a multiplicity of applications. In one refinement, the magnet which is arranged on the storage vessel and/or the dispenser module is covered by means of a cap in a disconnected state of the dispenser system, in order to weaken or to interrupt the power of attraction. If the dispenser module is coupled to the storage vessel, the magnet and the at least partially magnetic and/or magnetizable element interact for an increase in volume of the medium chamber. Here, in one advantageous refinement, the magnet system also serves for mechanical coupling of the dispenser module to the storage vessel, additional coupling elements preferably being provided for centering or orientation of the dispenser module on the storage vessel.

In one refinement, a partially magnetic and/or magnetizable collapsible bag as medium chamber which is widened on account of a magnetic force during coupling is provided as magnet system. In another refinement, the medium chamber has a trailer piston, on which the at least one magnet and/or the at least one partially magnetic and/or magnetizable element are/is arranged and/or which is of at least partially magnetic and/or magnetizable design. The magnet and the element preferably do not bear against one another in a coupled state, but rather act in a contactless manner. As a result, a disconnection is possible without relatively great exertion. In one refinement, a magnetically insulating element which interrupts the power of attraction is moved between the magnet and the element for disconnecting purposes.

In advantageous refinements, the actuating apparatus is activated automatically during a coupling operation or after termination of a successful coupling operation. In other refinements, an activation of the actuating apparatus by way of a user, for example by means of the touch of a button or the like, is provided.

It goes without saying that a capacity of the medium chamber is usually selected to be smaller than a capacity of the storage vessel. The refillable dispenser module preferably has a capacity which is sufficient for a limited small number of discharging operations. In particular, a capacity preferably does not exceed a limit of 100 ml, with the result that the dispenser module can also be taken along by the consumer in his/her hand luggage on a flight.

In one refinement, the actuating apparatus additionally comprises pressure generation elements, by means of which an increased pressure can be generated in the storage vessel, in order to convey medium out of the storage vessel. On account of the increased pressure, medium is therefore conveyed out of the storage vessel into the medium chamber for pressure equalization. In one refinement, the storage vessel is designed as a ventilated squeeze bottle, the wall of the squeeze bottle acting as pressure generation elements, by means of which an increased pressure can be generated in the storage vessel when pressed together. Here, the at least one inlet valve and the at least one outlet valve are preferably designed as pressure-loaded valves which open if the deformation force is applied, in order to bring about conveying of the medium out of the storage vessel, and close if the deformation force is discontinued, in order to prevent a return flow. In another refinement, the storage vessel has a closed chamber with a variable volume, which chamber is force-loaded in a coupled state, in particular is force-loaded by means of a spring element. As a result, the medium which is stored in the storage vessel is conveyed reliably.

In one advantageous refinement, the dispenser module and the storage vessel have coupling elements which are complementary to one another for repeatable, functional coupling which can be released without destruction, the at least one inlet valve and the at least one outlet valve being open in a forcibly actuated or pressure-loaded manner, in a coupled state, at least temporarily during an actuation of the pumping apparatus, in order to bring about conveying of the medium out of the storage vessel in a couple state.

In other words, the dispenser module and the storage vessel form one functional unit in the coupled state, it being possible for the pumping apparatus to be actuated, in order to bring about conveying of the medium out of the storage vessel in a coupled state. In a disconnected state, the dispenser module can be utilized as an independent apparatus. The dispenser module is therefore capable of dispensing both in a disconnected state and in a coupled state. To this end, the coupling elements are designed in such a way that repeatable, functional coupling which can be released without destruction is possible. The coupling elements and the communicating valves, namely the at least one inlet valve and the at least one outlet valve, are preferably designed as separate components, with the result that fluidic coupling takes place via the valve elements and mechanical coupling takes place via further parts. In one refinement, the coupling elements are designed as a plug-in connection, for example comprising sockets and plug-in pins. A bayonet closure is provided in another refinement. Finally, a connection takes place by means of a magnetic closure in yet another refinement. In yet another refinement, the individual connecting systems are combined with one another. For example, a plug-in connection is provided in one refinement, a magnetic closure being activated in a latching position. Here, a magnet and an element of the actuating apparatus serve as magnetic closure in one refinement.

For a filling operation, the at least one inlet valve and the at least one outlet valve are open in a forcibly actuated or pressure-loaded manner. It is provided in one advantageous refinement that the at least one inlet valve and the at least one outlet valve are open permanently in a forcibly actuated manner in a coupled state. For this purpose, in one refinement, the at least one inlet valve and the at least one outlet valve have two interacting force-loaded valve pistons which are adjusted into an open position in a coupled state. In advantageous refinements, loading of force of the valve pistons takes place by means of restoring springs which force the valve pistons in each case into a closed position. In other refinements, other elements for force loading are provided, for example by means of magnetic force or the like. The valve pistons in each case preferably have an actuating section, the actuating sections of the valve pistons interacting during coupling for forcible actuation of the valve pistons into the open position. It is provided in an alternative refinement that at least one of the two communicating valves, namely the at least one inlet valve and/or the at least one outlet valve, is designed as a pressure-controlled valve, with the result that, in a coupled state, the at least one inlet valve and/or the at least one outlet valve opens/opens in a pressure-controlled manner at a differential pressure threshold value. Here, the at least one pressure-controlled valve is closed in a rest state of the dispenser system and is opened only as required by way of the application of a differential pressure. The at least one pressure-controlled valve is preferably designed and/or arranged in such a way that it opens at a pressure which is higher in the storage vessel by the differential pressure threshold value in comparison with the medium chamber. Here, a differential pressure which is generated by means of the actuating apparatus is preferably selected in such a way that the differential pressure is greater than or equal to the differential pressure threshold value for opening the pressure-controlled inlet valve or outlet valve. In one advantageous refinement, the pressure-actuated valves are designed as pressure-dependent opening slit valves. In conjunction with the invention, a slotted diaphragm element which is arranged over an opening is called a slit valve, which diaphragm element opens in a discharging direction if an opening pressure prevails on a side which lies upstream of the valve in the discharging direction or a vacuum prevails on a side which lies downstream of the valve in the discharging direction, but closes the opening in the direction counter to the discharging direction. Elastic plastics such as TPE (thermoplastic elastomers) are suitable for slit valves of this type.

In advantageous refinements, the medium chamber has a main chamber with a variable volume and a connector chamber which communicates with the main chamber, has the inlet valve, and into which the inlet channel of the pumping apparatus opens. The design ensures that a volume around the inlet channel remains unchanged even in the case of a change in the volume of the medium chamber.

In the coupled state, a force which counteracts conveying of the medium out of the main chamber into the connector chamber is preferably greater than a force which counteracts conveying of the medium out of the storage vessel into the connector chamber. For this purpose, in one refinement, the connections are selected in such a way that a flow resistance between the main chamber and the connector chamber is greater than the flow resistance between the storage vessel and the connector chamber. In other refinements, the main chamber with a variable volume has a trailer piston, trailing of the trailer piston being counteracted by forces which are greater than the forces which counteract conveying of the medium. In particular, the utilization of the actuating elements to generate a pressure difference is advantageous here. In particular, it is provided in one refinement that the trailer piston of the main chamber is held in a position by means of magnetic powers of attraction, trailing of the trailer piston and therefore conveying of the medium out of the main chamber being prevented. It is possible as a result that conveying of the medium in a coupled state preferably takes place out of the storage vessel. Depending on the design, after emptying of the storage vessel, the medium is conveyed out of the main chamber, or the dispenser module is to be disconnected from the storage vessel in order to empty said dispenser module.

The main chamber and the connector chamber are preferably in communication with one another via a connecting section which is designed as an annular gap.

For a simple design which is relatively insusceptible to disruptions, the dispenser module preferably has a trailer piston which closes off the medium chamber. In advantageous refinements, the trailer piston is designed as an at least partially magnetic or magnetizable element which interacts with the magnets of the actuating apparatus or is coupled to said element.

As mentioned above, the storage vessel is designed in one refinement as a squeeze bottle with a ventilating opening. In advantageous refinements, the storage vessel has at least one closed chamber which stores the medium with a variable volume. As a result, a sensitive medium can be stored over a relatively long time period without contact with the surroundings and therefore in a protected manner.

In one refinement, a first medium is provided in the medium chamber of the dispenser module, which first medium, when coupled to the storage vessel, is mixed with a second medium which is stored in the latter. During or after coupling of the dispenser module to the storage vessel, the second medium is conveyed into the medium chamber. In one refinement, the first and the second medium are media which react with one another. In other refinements, one medium is more sensitive, with the result that different requirements with regard to sealing or the like are made of the associated chamber. The outlet valve, the inlet valve and/or a channel which communicates with them and/or adjoins them are preferably designed in such a way that a return flow into the storage vessel is prevented.

BRIEF DESCRIPTION OF THE DRAWINGS

Further advantages and aspects of the invention result, apart from the claims, also from the following description of preferred exemplary embodiments of the invention which are explained in the following text using the figures, in which:

DETAILED DESCRIPTION OF THE EXEMPLARY EMBODIMENTS

Figure 1:
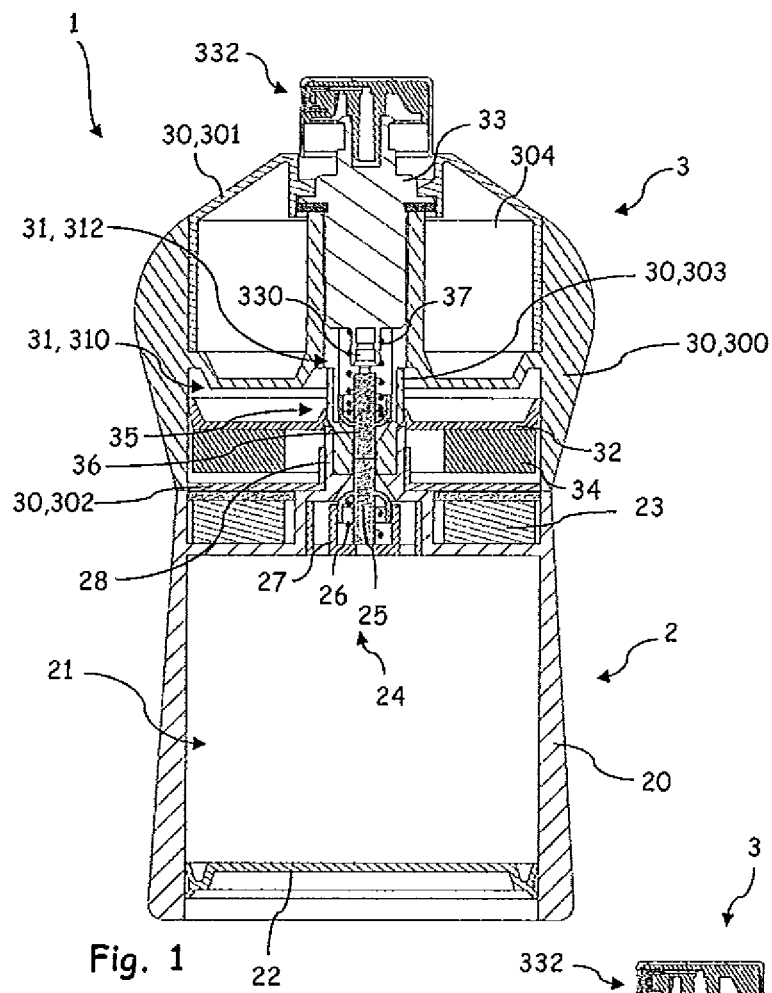
FIG. 1 shows a first exemplary embodiment of a dispenser system with a dispenser module and a storage vessel in a coupled state.
Figure 2:
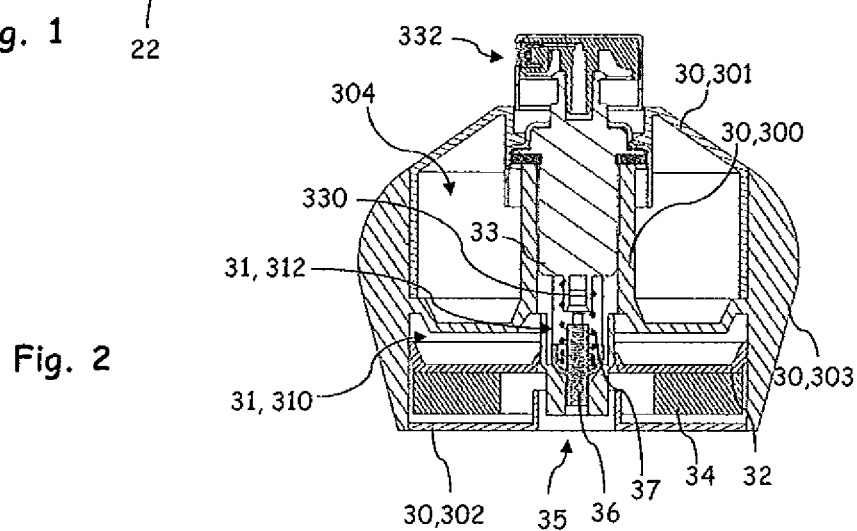
FIG. 2 shows the dispenser module according to FIG. 1 in a disconnected state.

FIG. 1 shows a sectioned illustration of a dispenser system 1 comprising a storage vessel 2 for storing a medium (not shown) and a refillable dispenser module 3 in a coupled state, the dispenser module 3 and the storage vessel 2 being coupled functionally to one another and forming one functional unit. In addition, the dispenser module 3 can be disconnected from the storage vessel 2 and can be utilized as an independent functional unit. FIG. 2 shows the dispenser module 3 on its own.

The dispenser module 3 has a housing 30 which partially delimits a medium chamber 31 which can be filled with medium. The housing 30 which is shown is in multiple pieces, comprising a main housing 300, a cover 301, a bottom 302 and a sleeve 303 which is arranged in the main housing 300 concentrically with respect to the main housing 300. Here, a cavity 304 remains between the main housing 300 and the cover 301 in the exemplary embodiment which is shown. The medium chamber 31 is designed as a closed chamber with a variable volume, a displaceably mounted trailer piston 32 being provided for a volume variation. In the exemplary embodiment which is shown, the sleeve 303 is manufactured as a common component with the main housing 300. The sleeve 303 has three regions which adjoin one another in the longitudinal direction and have different diameters. Apertures for a passage of medium are provided between a middle region of the sleeve 303 and the region which adjoins it at the top in the drawing. An outer shell of the middle region serves as a guide for the trailer piston 32. The bottom 302 has an aperture which is surrounded by a sleeve-like projection which is arranged concentrically with respect to the sleeve 303, the sleeve-like projection of the bottom 302 forming a gap together with a lower region of the sleeve 303.

A manually actuable pumping apparatus 33 is provided for discharging the medium out of the medium chamber 31. In the exemplary embodiment which is shown, the pumping apparatus 33 is designed in such a way that a medium is sucked in via an inlet channel 330 and is output as a spray jet via a discharge opening 332. Here, the pumping apparatus 33 is designed in such a way that no ventilation into the medium chamber 31 takes place. A pump housing of the pumping apparatus 33 is mounted in a stationary manner between the sleeve 303 and the cover 301 in the housing 30 of the dispenser module 3. Furthermore, the pumping apparatus 33 comprises a discharge head which has the discharge opening 332 and can be displaced relative to the pump housing for an actuation of the pumping apparatus 33.

A magnetic or magnetizable element 34, the function of which will be explained further below, is attached to the trailer piston 32.

The dispenser module 3 is refillable. For this purpose, the dispenser module 3 has an inlet valve 35 with a valve piston 36. The valve piston 36 can be adjusted counter to the force of a restoring spring 37. In the closed state which is shown in FIG. 2, the valve piston 36 lies against the region of the housing 30 which forms the valve seat. The dispenser module 3 is therefore capable of dispensing in the state which is shown in FIG. 2, the trailer piston 32 being adjusted for pressure equalization during the discharge of the medium.

In the coupled state (shown in FIG. 1) of the dispenser module 3 to the storage vessel 2, the inlet valve 35 is open. Here, in the open state of the inlet valve 35, the valve piston 36 is adjusted into an open position counter to the force of the restoring spring 37, with the result that filling with a medium is possible via the inlet valve 35.

The medium chamber 31 which is shown has a variable-volume main chamber 310 and a connector chamber 312 which communicates with the main chamber 310 via a channel which is formed between the sleeve 303 and the main housing 300. In the exemplary embodiment which is shown, the inlet valve 35 is provided on the connector chamber 312, into which the inlet channel 330 of the pumping apparatus 33 also opens.

The storage vessel 2 has a housing 20 which laterally delimits a chamber 21. A trailer piston 22 is arranged in the housing 20 in such a way that the chamber 21 is closed off in a variable-volume manner for storing a medium. A magnet 23, the function of which will be explained further below, is provided at an end which lies opposite the trailer piston 22. Furthermore, an outlet valve 24 with a valve piston 25, a restoring spring 26 and an abutment 27 is provided at the end which lies opposite the trailer piston 22.

The valve piston 25 can be adjusted counter to the force of the restoring spring 26, a maximum adjusting travel being delimited by way of the abutment 27. The abutment 27 is designed in such a way that a satisfactory approaching flow of the outlet valve 24 is ensured.

In the exemplary embodiment which is shown, the valve pistons 36, 25 of the inlet valve 35 and of the outlet valve 24 interact for an adjusting movement, with the result that the valve pistons 36, 25 of the inlet valve 35 and of the outlet valve 24 are adjusted in each case into an open position in the coupled state. The medium chamber 31 thus communicates permanently with the storage vessel 2, more precisely with the chamber 21 of the storage vessel 2, in the coupled state. If there is a pressure difference between the communicating chambers 31, 21, the medium is conveyed for pressure equalization.

In the exemplary embodiment which is shown, the inlet valve 35 and the outlet valve 24 are therefore open permanently in a forcibly actuated manner in the coupled state, in other words. During an actuation of the pumping apparatus 33 in the coupled state, medium is sucked in out of the connector chamber 312. Here, in the exemplary embodiment which is shown, a force to be applied for trailing the trailer piston 22 of the storage vessel 2 is lower than a force to be applied for trailing the trailer piston 32 in the main chamber 310 of the medium chamber 31. As a result, in the coupled state which is shown, the medium is overridingly conveyed out of the chamber 21 of the storage vessel 2 during an actuation of the pumping apparatus 33.

During a disconnection of the dispenser module 3 from the storage vessel 2, the inlet valve 35 and the outlet valve 24 close suddenly, with the result that medium is prevented from running out.

The dispenser module 3 is therefore capable of dispensing both in the attached state and on its own. In the exemplary embodiment which is shown, the double function of the dispenser module 3 as an independent structural unit and in combination with the storage vessel 2 is also visualized by way of a shape for the user. The housing 20 of the storage vessel 2 is designed as a conical, rotationally symmetrical column, an external diameter of the housing 20 increasing in the direction of a bottom-side end. Here, a cone angle is selected to be small. The housing 30 of the dispenser module 3 which is shown is likewise of rotationally symmetrical and spherical or onion-shaped design. The housing 30 is attached onto the housing 20 of the storage vessel 2 in a dome-like manner. The two parts of the dispenser system 1 can therefore in each case be perceived as an independent element. At the same time, the shapes are adapted to one another in such a way that they form one esthetic unit in the coupled state which is shown. The shape of the housing 30 is advantageous not only for esthetic reasons. It also makes satisfactory haptics for an actuation of the pumping apparatus 33 possible.

As mentioned above, the storage vessel 2 and the dispenser module 3 have a magnet 23 and a magnetic and/or magnetizable element 34, respectively. In the exemplary embodiment which is shown, said elements have a double function.

They serve firstly as coupling elements, in order to connect the dispenser module 3 and the storage vessel 2 to one another in a repeatedly releasable manner which is free from destruction. During connection, the inlet valve 35 and the outlet valve 24 are opened here, with the result that the medium chamber 31 and the chamber 21 of the storage vessel 2 are permanently coupled fluidically. In addition, in the exemplary embodiment which is shown, the regions around the inlet valve 35 and the outlet valve 24 are designed as a plug-in connection, with the result that an orientation or centering of the components for fluidic connection is ensured. For this purpose, the housing 30 of the dispenser module 3 has an annular gap which is formed between the bottom 302 and the sleeve 303 and into which a complementary sleeve 28 of the housing 20 of the storage vessel is introduced. In the exemplary embodiment which is shown, the sleeve 28 and the gap are arranged rotationally symmetrically and concentrically with respect to a longitudinal axis of the dispenser system 1. In other refinements, non-rotationally symmetrical and/or eccentric arrangements are provided, a connection of the parts being possible only in a defined orientation.

The magnet 23 and the magnetic and/or magnetizable element 34 serve further as actuating elements, by means of which a differential pressure between the medium chamber 31 and the storage vessel 2, more precisely the chamber 21 of the storage vessel 2, can be generated during or after coupling. In the exemplary embodiment which is shown, on account of a power of attraction which is exerted by the magnet 23 on the magnetic and/or magnetizable element 34, the trailer piston 32 of the dispenser module 3 is displaced, with the result that a volume of the medium chamber 31 is enlarged. On account of the enlargement of the volume, a pressure drop occurs in the medium chamber 31, medium being conveyed out of the storage vessel 2 into the medium chamber 31 for pressure equalization. Pressure equalization in the storage vessel 2 takes place by way of trailing of the trailer piston 22. The magnetic power of attraction acts as long as the parts are coupled. The magnetic power of attraction on the trailer piston 32 therefore also counteracts trailing of the trailer piston 32 during an actuation of the pumping apparatus 33 in a coupled state, with the result that the medium is overridingly conveyed out of the chamber 21 of the storage vessel 2 during an actuation of the pumping apparatus 33.

Instead of the trailer piston 22, the storage vessel 2 has a ventilating opening for pressure equalization in other refinements. Here, conveying of the medium takes place via a riser tube. In yet another refinement, the medium is stored in the storage vessel 2 in a collapsible bag or folding bellows, ventilation of the storage vessel 2 which is sufficient for the movement of the collapsible bag or folding bellows being ensured.

Thanks to the magnet 23 and the magnetic and/or magnetizable element 34, a dispenser system 1 is provided for each of said refinements, the refilling mechanism of which dispenser system 1 is scarcely visible or invisible to the consumer, and in which dispenser system 1 refilling is possible without "active" actions of the consumer. In the exemplary embodiment which is shown, the magnet 23 and the element 24 are designed in each case as annular disks. Other refinements are conceivable, however. It is also conceivable, in particular, to provide in each case a plurality of magnets with different, alternating polarities on the dispenser module 3 and the storage vessel 2, which magnets assist coupling in a defined orientation.

The coupling functions of the magnet system are taken over by other systems in other refinements.

Figure 3:
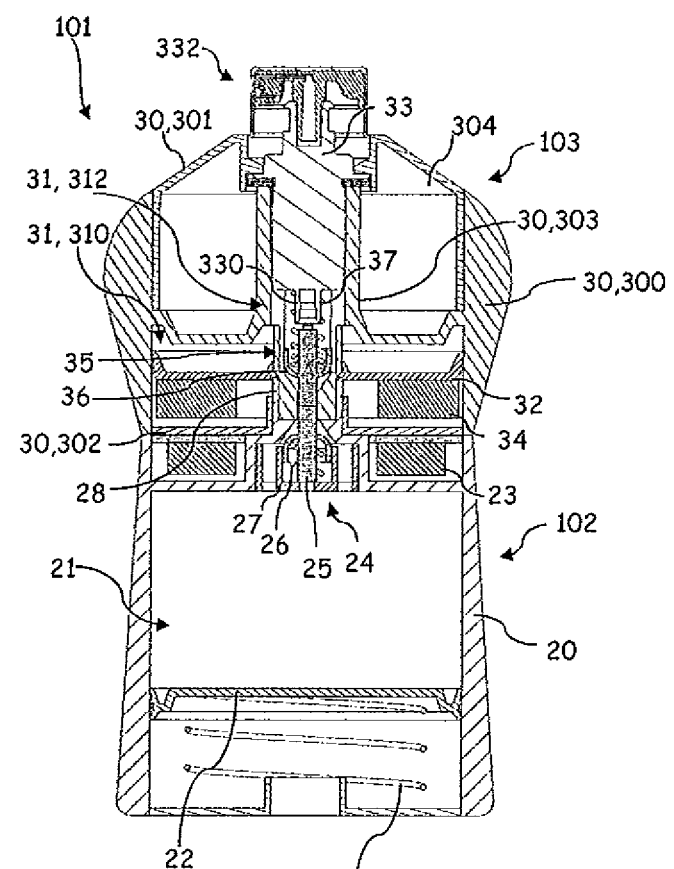
FIG. 3 shows a second exemplary embodiment of a dispenser system with a dispenser module and a storage vessel in a coupled state.

FIG. 3 shows an alternative refinement of a dispenser system 101 comprising a storage vessel 102 with an outlet valve 24 and a dispenser module 103 with an inlet valve 35. The dispenser system 101 is similar to the dispenser system 1 according to FIGS. 1 and 2, and uniform designations are used for identical or similar components. In contrast to the refinement according to FIGS. 1 and 2, the trailer piston 22 of the storage vessel 102 is additionally loaded by means of a spring 4. By means of the spring 4, the trailer piston 22 is forced in a direction for reducing the size of the medium chamber 21, the (incompressible) medium counteracting the movement. A discharge of the medium occurs during opening of the outlet valve 24.

The invention claimed is:

1. A dispenser system comprising
a storage vessel for storing a medium with at least one outlet valve,
a refillable dispenser module with a medium chamber which can be filled with a medium, with a pumping apparatus which has an inlet channel and can be actuated for discharging the medium out of the medium chamber, and with at least one inlet valve, and
an actuating apparatus,
wherein
the medium chamber is designed as a closed chamber with a variable volume,
the dispenser module can be coupled to the storage vessel for filling the medium chamber, the at least one inlet valve and the at least one outlet valve being open in a forcibly actuated or pressure-loaded manner during filling, with the result that the medium chamber communicates with the storage vessel,
the at least one inlet valve and the at least one outlet valve are closed in a disconnected state of the dispenser module and the storage vessel, and
a volume of the medium chamber can be enlarged by means of the actuating apparatus during or after the coupling of the dispenser module and the storage vessel in order to generate a differential pressure between the medium chamber and the storage vessel, a pressure in the storage vessel being higher than in the medium chamber, in order to convey the medium out of the storage vessel into the medium chamber,
wherein
the actuating apparatus has at least one magnet and at least one at least partially magnetic or magnetizable element that interacts with the at least one magnet for a volume change of the medium chamber.

2. The dispenser system as claimed in claim 1, wherein the actuating apparatus additionally has pressure generation elements, that can generate an increased pressure in the storage vessel, in order to convey medium out of the storage vessel into the medium chamber.

3. The dispenser system as claimed in claim 1, wherein the dispenser module and the storage vessel have coupling elements that are complementary to one another for repeatable, functional coupling that can be released without destruction, the at least one inlet valve and the at least one outlet valve being open in a forcibly actuated or pressure-loaded manner, in a coupled state, at least temporarily during an actuation of the pumping apparatus, in order to bring about conveying of the medium out of the storage vessel in the coupled state.

4. The dispenser system as claimed in claim 3, wherein the coupling elements form a plug-in connection, a bayonet closure and/or a magnetic closure.

5. The dispenser system as claimed in claim 1, wherein the at least one inlet valve and the at least one outlet valve have two interacting force-loaded valve pistons that are adjusted into an open position in a coupled state.

6. The dispenser system as claimed in claim 1, wherein the medium chamber has a main chamber with a variable volume and a connector chamber with a constant volume that communicates with the main chamber and has the at least one inlet valve, the inlet channel of the pumping apparatus opening into the connector chamber.

7. The dispenser system as claimed in claim 6, wherein, in a coupled state, a force that counteracts conveying of the medium out of the main chamber into the connector chamber is greater than a force that counteracts conveying of the medium out of the storage vessel into the connector chamber.

8. The dispenser system as claimed in claim 6, wherein the main chamber and the connector chamber communicate with one another via a connecting section that is configured as an annular gap.

9. The dispenser system as claimed in claim 1, wherein the medium chamber has a trailer piston.

10. The dispenser system as claimed in claim 9, wherein the actuating apparatus has the at least one magnet that is arranged on the storage vessel and the at least one at least partially magnetic or magnetizable element that is arranged on the trailer piston or is configured in one piece with the trailer piston and interacts with the at least one magnet for a volume change of the medium chamber.

11. The dispenser system as claimed in claim 1, wherein the storage vessel has at least one closed chamber with a variable volume that stores the medium.

* * * * *